US010488959B2

(12) United States Patent
Aurongzeb et al.

(10) Patent No.: US 10,488,959 B2
(45) Date of Patent: Nov. 26, 2019

(54) FLEXIBLE ROLL-UP INFORMATION HANDLING SYSTEM

(71) Applicant: DELL PRODUCTS L.P., Round Rock, TX (US)

(72) Inventors: Deeder M. Aurongzeb, Austin, TX (US); Jason Scott Morrison, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 724 days.

(21) Appl. No.: 14/932,429

(22) Filed: Nov. 4, 2015

(65) Prior Publication Data
US 2017/0123536 A1    May 4, 2017

(51) Int. Cl.
G06F 3/041    (2006.01)
H04M 1/02    (2006.01)
G06F 1/16    (2006.01)

(52) U.S. Cl.
CPC .......... G06F 3/0412 (2013.01); G06F 1/1615 (2013.01); G06F 1/1643 (2013.01); G06F 1/1652 (2013.01); G06F 1/1677 (2013.01); G06F 1/1679 (2013.01); H04M 1/0241 (2013.01); H04M 1/0268 (2013.01); G06F 2200/1632 (2013.01); G06F 2203/04102 (2013.01); G06F 2203/04103 (2013.01); H04M 2250/22 (2013.01)

(58) Field of Classification Search
CPC .......... G06F 3/0412; G06F 2203/04103; G06F 2203/04102; G06F 1/1679; G06F 1/1615; G06F 1/1643; G06F 1/1677; G06F 1/1652; G06F 2200/1632; H04M 1/0268; H04M 1/0241; H04M 2250/22
See application file for complete search history.

(56) References Cited

U.S. PATENT DOCUMENTS

| 4,986,016 A | * | 1/1991 | Wichman .............. E04B 1/3441 40/610 |
| 6,498,597 B1 | | 12/2002 | Sawano |
| 2004/0052037 A1 | | 3/2004 | Sawyer |
| 2005/0040962 A1 | * | 2/2005 | Funkhouser .......... G06F 1/1601 340/815.4 |

(Continued)

FOREIGN PATENT DOCUMENTS

JP    2009/021660    1/2009

OTHER PUBLICATIONS

International Search Report and Written Opinion of International PCT Application No. PCT/US2016/040043, dated Sep. 15, 2016; 13 pages.

(Continued)

Primary Examiner — Kent W Chang
Assistant Examiner — Joseph P Fox
(74) Attorney, Agent, or Firm — Baker Botts L.L.P.

(57) ABSTRACT

A flexible roll-up information handling system may include two chassis bodies that are connected using two scissor hinges for opening and closing. A coiled flexible display may be provided at an external surface for operation by a user, and may be rolled up in one of the chassis bodies, while being fixed to the other chassis body. The scissor hinges may be adjusted to provide friction to balance the closing force of the coiled flexible display, which may include a steel spring backing layer.

19 Claims, 6 Drawing Sheets

(56) References Cited

U.S. PATENT DOCUMENTS

| | | | |
|---|---|---|---|
| 2006/0061555 A1 | 3/2006 | Mullen | |
| 2012/0314400 A1* | 12/2012 | Bohn | G09F 9/301 362/97.1 |
| 2013/0058063 A1* | 3/2013 | O'Brien | G06F 1/1624 361/807 |
| 2013/0155052 A1* | 6/2013 | Ko | H04N 13/122 345/419 |
| 2013/0314762 A1* | 11/2013 | Kwack | G02F 1/09 359/280 |
| 2014/0268532 A1* | 9/2014 | Nicol | G09F 9/301 361/679.26 |
| 2015/0220188 A1* | 8/2015 | Zhao | G09G 3/36 345/174 |
| 2018/0182359 A1* | 6/2018 | Liu | G09G 5/363 |
| 2018/0217679 A1* | 8/2018 | Kwon | G06F 3/04883 |

OTHER PUBLICATIONS

International Preliminary Report on Patentability for PCT Patent Application No. PCT/US2016/040043, dated May 17, 2018; 9 pages.

\* cited by examiner

FLEXIBLE ROLL-UP INFORMATION HANDLING SYSTEM

BACKGROUND

Field of the Disclosure

This disclosure relates generally to information handling systems and, more particularly, to a flexible roll-up information handling system.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device.

SUMMARY

In one aspect, a portable information handling system is disclosed. The portable information handling system may include a coiled flexible display comprising a spring layer and a display layer bonded together. At least a portion of the coiled flexible display may be accessible at an external surface of the portable information handling system. The portable information handling system may include a first chassis body for receiving a coil bushing attached to a first end of the coiled flexible display, the coil bushing enabled to roll up the coiled flexible display around the coil bushing, and a second chassis body for receiving a second end of the coiled flexible display attached to the second chassis body.

In any of the disclosed embodiments, the display layer may include touch sensors, while the portable information handling system may use the touch sensors to receive touch input from a user.

In any of the disclosed embodiments, the portable information handling system may further include two scissor hinges coupled to the first chassis body and the second chassis body. Each of the scissor hinges may be coupled using two low friction pins respectively to the first chassis body and the second chassis body. In any of the disclosed embodiments, each of the scissor hinges may further include a hinge pin to open and close the scissor hinge. The hinge pin may allows for mechanical adjustment of a frictional force to open and close the scissor hinge. In any of the disclosed embodiments, the frictional force may be selected to maintain a distance of separation between the first chassis body and the second chassis body when the scissor hinge is opened or closed.

In any of the disclosed embodiments, the spring layer may provide a closing force to rotate the coil bushing and bring the first chassis body and the second chassis body together.

In any of the disclosed embodiments, the portable information handling system may further include a cylindrical opening penetrating the coil bushing for receiving a stylus usable to provide the touch input.

In any of the disclosed embodiments, the display layer may include an organic light emitting diode (OLED) array. In any of the disclosed embodiments, a radius of the coiled bushing may be selected to exceed a minimum bending radius for the organic light emitting diode array.

Additional disclosed aspects include a display device for a portable information handling system, as well as a method for operating a flexible roll-up information handling system.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2, 3, 4, 5 and 6 wherein like numbers are used to indicate like and corresponding parts.

Figure 1:
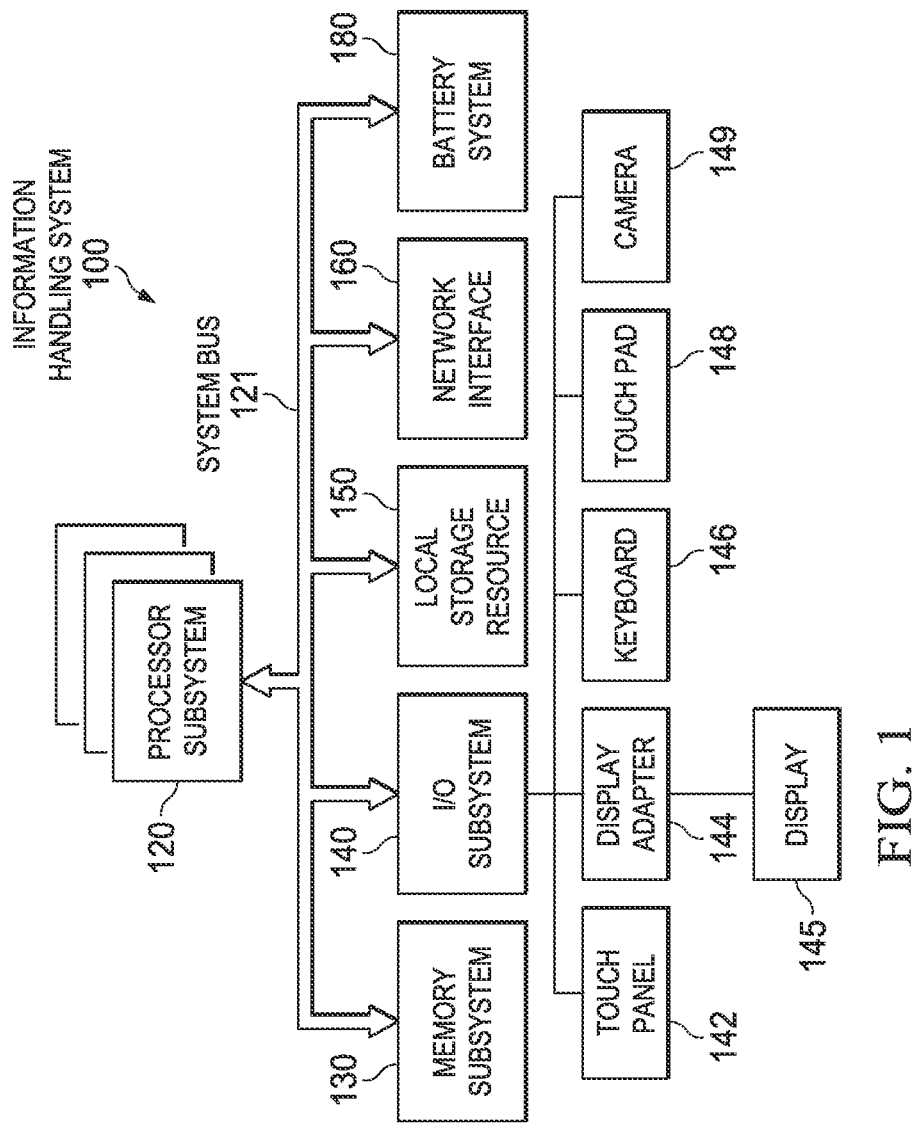
FIG. 1 is a block diagram of selected elements of an embodiment of an information handling system.

Turning now to the drawings, FIG. 1 illustrates a block diagram depicting selected elements of an embodiment of information handling system 100. In various embodiments, information handling system 100 may represent different types of portable devices.

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, a network interface 160, and battery system 180. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. Also shown is battery system 180, which may represent a rechargeable battery and related components included with information handling system 100.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130). In the same or alternative embodiments, processor subsystem 120 may interpret and execute program instructions and process data stored remotely (e.g., in a network storage resource).

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage or a suitable selection or array of volatile or nonvolatile memory that retains data after power is removed. Local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. As shown, I/O subsystem 140 may comprise touch panel 142, display adapter 144, keyboard 146, touch pad 148, and camera 149. Touch panel 142 may include circuitry for enabling touch functionality in conjunction with a display device, shown as display 145, that is driven by display adapter 144. Camera 149 may represent any of a variety of imaging devices, such as a video camera, infrared camera, or combinations thereof.

As will be described in further detail herein, information handling system 100 may be implemented as a flexible roll-up information handling system.

Figure 2:
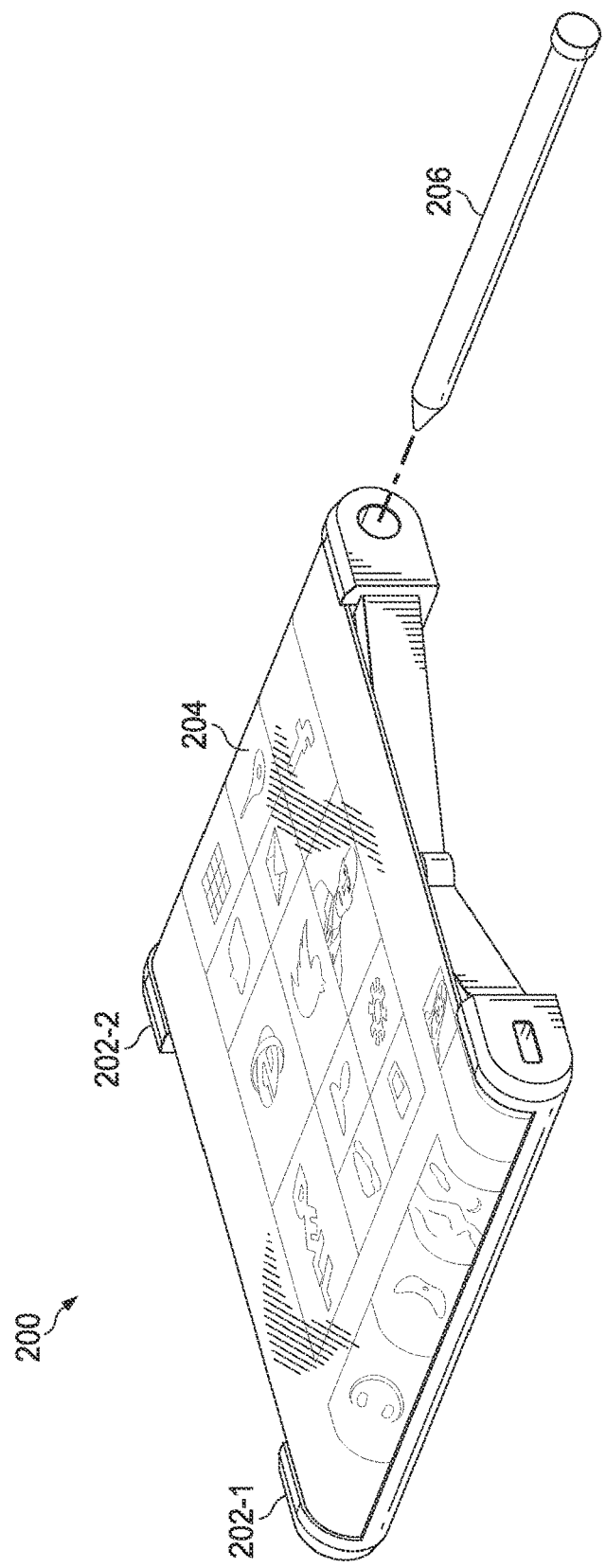
FIG. 2 is an illustration of selected elements of an embodiment of a flexible roll-up information handling system.

Referring now to FIG. 2, an illustration of selected elements of an embodiment of flexible roll-up information handling system 200 is shown. As shown, flexible roll-up information handling system 200 may be an embodiment of information handling system 100 in FIG. 1. Flexible roll-up information handling system 200 is a hand-held device that comprises a first chassis body 202-1 and a second chassis body 202-2 that are mechanically coupled using two scissor hinges to enable closing and opening. When flexible roll-up information handling system 200 is opened, first chassis body 202-1 and second chassis body 202-2 are pulled apart by the user; when flexible roll-up information handling system 200 is closed, first chassis body 202-1 and second chassis body 202-2 are pushed together. In FIG. 2, flexible roll-up information handling system 200 is opened showing a coiled flexible display 204 that is accessible at an external surface for use by a user. As will be described in further detail, coiled flexible display 204 may include display and touch functionality and may be internally fixed at one edge to first chassis body 202-1, and may roll-up within second chassis body 202-2 when closed (obscured from view in FIG. 2). Also shown in FIG. 2 is a stylus 206, which may be used to provide touch input to coiled flexible display 204, and may be stored in a cylindrical opening within second chassis body 202-2.

Figure 3:
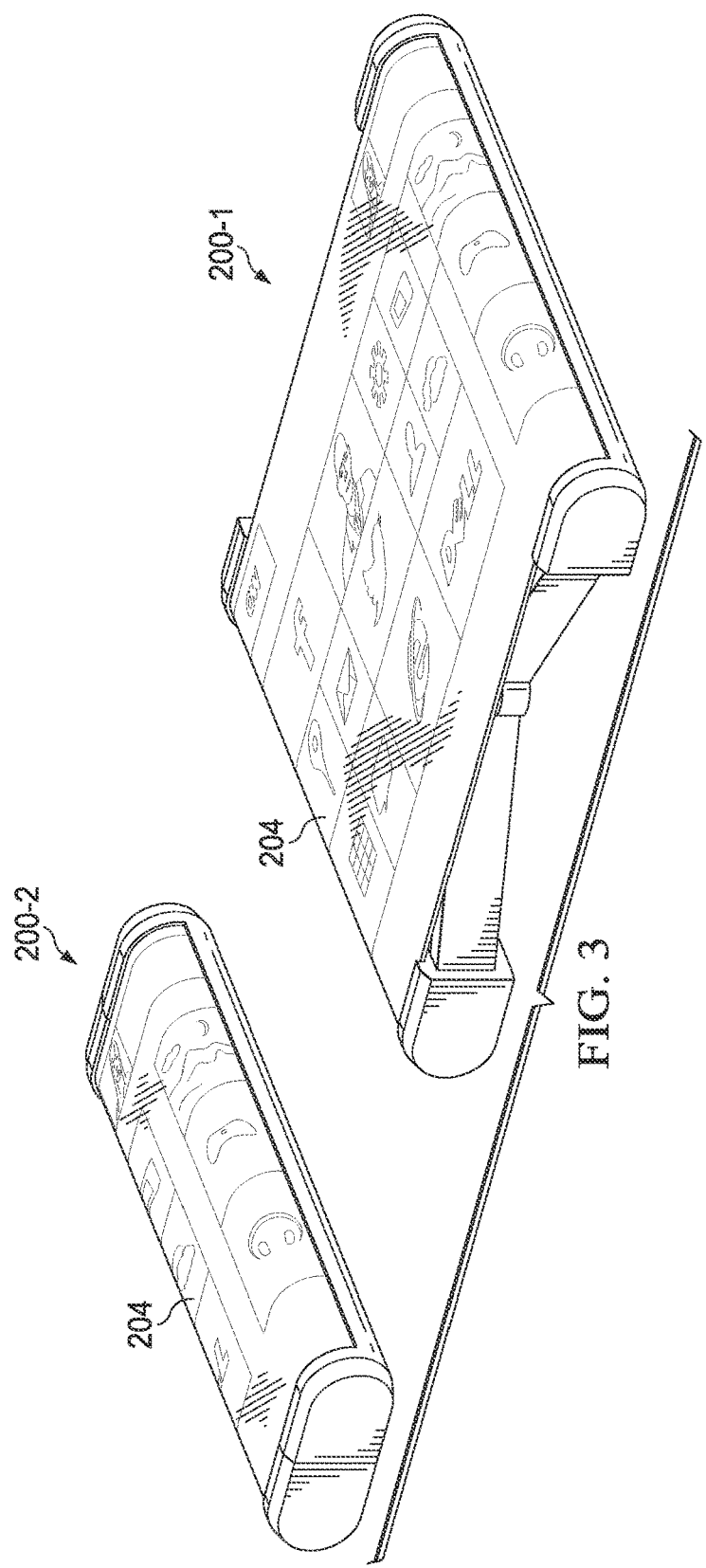
FIG. 3 is an illustration of selected elements of an embodiment of a flexible roll-up information handling system.

Referring now to FIG. 3, an illustration of selected elements of an embodiment of flexible roll-up information handling system 200 is shown. In FIG. 3, flexible roll-up information handling system 200-1 is opened with a large area of coiled flexible display 204 visible, while flexible roll-up information handling system 200-2 is closed with a smaller area of coiled flexible display 204 visible. Because the roll-up operation of flexible roll-up information handling system 200 is continuous, flexible roll-up information handling system 200 may be opened to any position between those shown for flexible roll-up information handling systems 200 1 and 200-2 for use. For example, a display adapter, such as display adapter 144, driving flexible roll-up information handling system 200, may respond to detection of the exposed display region and drive a user interface sized to the display region.

Figure 4:
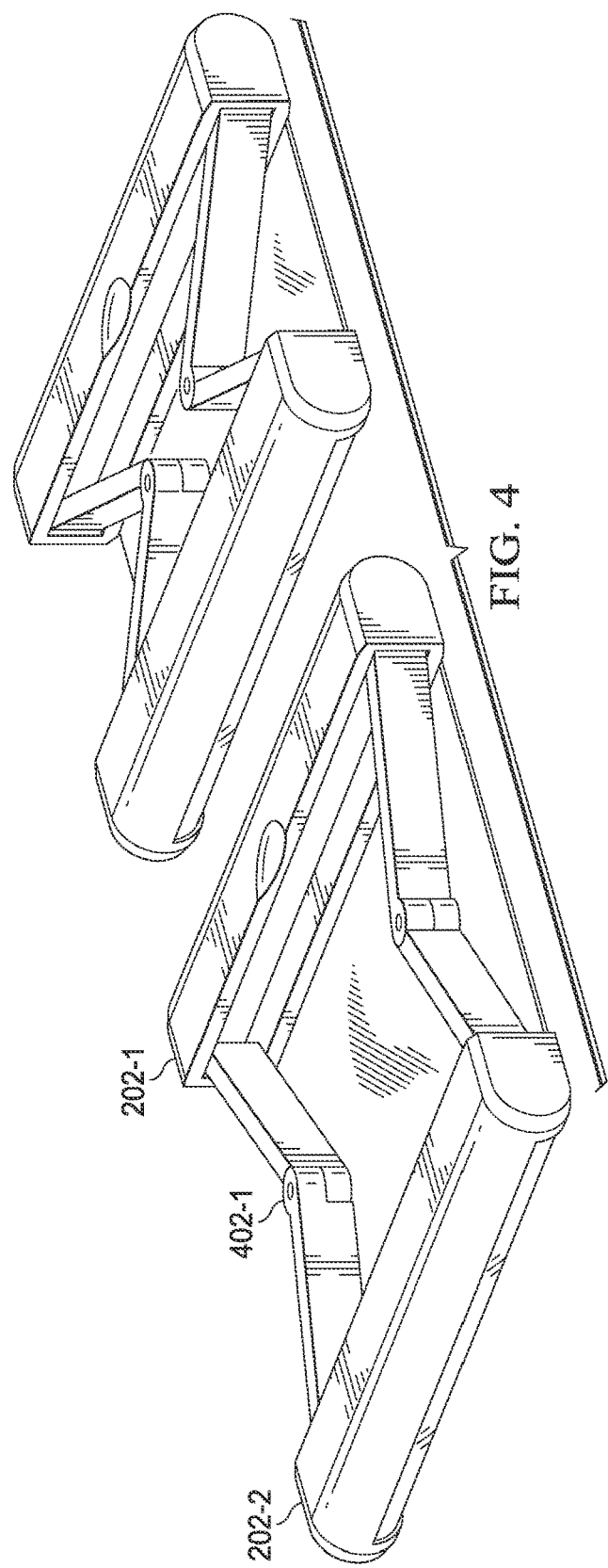
FIG. 4 is an illustration of selected elements of an embodiment of a flexible roll-up information handling system.

Referring now to FIG. 4, an illustration of selected elements of an embodiment of flexible roll-up information handling system 200 is shown. In FIG. 4, flexible roll-up information handling system 200 is shown from a backside view in which scissor hinges 402 are now visible. Specifically, flexible roll-up information handling system 200 may include first scissor hinge 402-1 and second scissor hinge 402-2 to enable opening and closing of first chassis body 202-1 and second chassis body 202-2, as well as to maintain planarity. Each scissor hinge 402 may be fixed at each end with a low friction (or substantially frictionless pin) respectively to first chassis body 202-1 and second chassis body 202-2 and may include a hinge pin that enables opening and closing of the scissor hinge 402. The hinge pin may include a means for mechanical adjustment of a frictional force that resists opening and closing. The friction provided by the hinge pin may counteract a roll-up force provided by the coiled flexible display and may be adjusted such that flexible roll-up information handling system 200 remains open at any desired position of scissor hinge 402, and hence, at any separation between fully opened and fully closed of first chassis body 202-1 and second chassis body 202-2.

Figure 5:
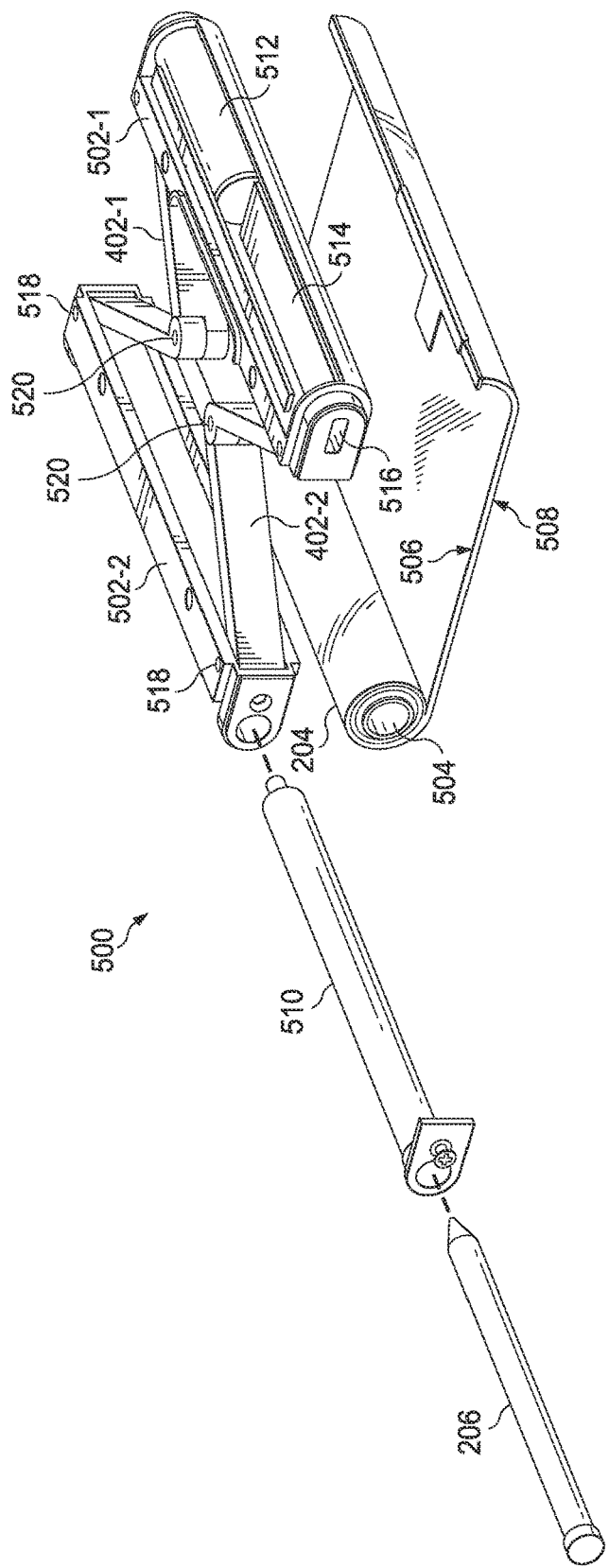
FIG. 5 is an illustration of selected elements of an embodiment of a flexible roll-up information handling system.

Referring now to FIG. 5, an illustration of selected elements of an embodiment of flexible roll-up information handling system 500 is shown. FIG. 5 is a schematic illustration and is not necessarily drawn to scale. FIG. 5 shows an exploded view of various internal components of flexible roll-up information handling system 500, which is shown without external covers for first chassis body 202-1 and second chassis body 202-2 shown in FIGS. 2-4, revealing first chassis frame 502-1 and second chassis frame 502-2.

In FIG. 5, first chassis frame 502-1 accommodates various components, such as shown in FIG. 1. For example, battery 512 may be housed within first chassis frame 502-1, along with motherboard 514, which may be populated with processor subsystem 120, memory subsystem 130, and display adapter 144, among other elements of information handling system 100. First chassis frame 502-1 may further provide for an external interface port 516, such as a Universal Serial Bus (USB) port. First chassis frame 502-1 and second chassis frame 502-2 may be attached to scissor hinges 402 using low friction pin 518, which are specifically designated in FIG. 2 at second chassis frame 502-2 for descriptive clarity. Each of scissor hinges 402-1 and 402-2 may include a hinge pin 520 with a friction adjustment mechanism, as described previously.

Also shown in FIG. 5 is coiled flexible display 204 having one end for fixed attachment to first chassis frame 502-1. The other end of coiled flexible display 204 is fixed to coil bushing 504 that provides a cylindrical roller about which coiled flexible display 204 may be externally rolled up. A radius of coil bushing 504 may be selected to exceed a minimum bending radius for coiled flexible display 204, or more specifically, for display layer 508. The minimum bending radius may define a minimum radius that display layer 508 can tolerate before being damaged. Coiled flexible display 204 may be comprised of two functional layers that may be bonded together to form a unitary sheet: a spring layer 506 and a display layer 508. Spring layer 506 may be a spring steel sheet that has been prepared to roll up in an equilibrium state. Accordingly, when flexible roll-up information handling system 500 is pulled apart, spring layer 506 may impart a closing force between first chassis frame 502-1 and second chassis frame 502-2. The closing force provided by spring layer 506 may be countered, or balanced, using hinge pins 520 in scissor hinges 402, which are mechanically adjustable for a given frictional force, as noted above.

Display layer 508 may include a flexible organic light emitting diode (OLED) array of display pixels, as well as an array of touch sensors. The touch sensors may be capacitive touch sensors, resistive touch sensors, or piezoelectric touch sensors, among other types. The touch sensors may be used to detect (or sense) an exposed area of display layer 508. For example, when the touch sensors are sensitive to temperature, or when a distributed thermal sensor is included in display layer 508, the exposed area of display layer 508 can be detected by thermal changes, such as warming of a certain portion. When the touch sensors include capacitive touch sensors, a change in capacitance, such as a baseline value of capacitance, may be used to detect the exposed area of display layer 508. When certain magnetic materials, such as a conductive polymer that is loaded with carbon based particles and magnetic ferrite, are used in display layer 508, a change in stress due to change in a magnetic field may be used to detect the exposed area of display layer 508.

As noted, certain piezoelectric materials may also be used in display layer 508. In general, piezoelectric materials possess the unique property of developing a differential charge on opposite volumetric surfaces in response to an applied mechanical deformation, which is the property used for sensing. Certain conformable piezoelectric polymers, such as polyvinylidene difluoride (PVDF) and polyvinylidene difluoride with copolymer trifluoroethylene (P(VDF-TrFE)), may generate small actuation forces when driven as an actuator, but may possess a relatively high piezoelectric stress constants, which is useful for high-performance sensing applications, such as in display layer 508. When loaded with 1-2% carbon nanotube, conformable piezoelectric polymers can withstand repetitive bending, such as experienced by display layer 508 in operation of coiled flexible display 204.

The connections for driving display and touch operation of display layer 508 may be provided at the first end of coiled flexible display 204 that is fixed to first chassis frame 502-1, in proximity to motherboard 514, for example. Spring layer 506 and display layer 508 may be bonded together using an adhesive over an entire surface of coiled flexible display 204 to form a unitary, flexible sheet. Spring layer 506 may also protect display layer 508 from being punctured or otherwise damaged while in use.

Also shown in FIG. 5 is bushing mount 510 that includes supports for coil bushing 504 and about which coil bushing 504 may be mounted to rotate freely within second chassis frame 502-2. Bushing mount 510 may be hollow and may provide the external cylindrical opening to house stylus 206 when not in use with flexible roll-up information handling system 500. Stylus 206 may be specifically designed to operate with coiled flexible display 204, such as with a low abrasive tip to avoid damaging display layer 508, among other features.

It is noted that flexible roll-up information handling system 500 may include other components and systems not visible in FIG. 5. For example, flexible roll-up information handling system 500 may include sensors to detect a degree of opening, or separation, of first chassis frame 502-1 and second chassis frame 502-2, and to accordingly ascertain a display area of coiled flexible display 204 that is presently exposed to a user.

Figure 6:
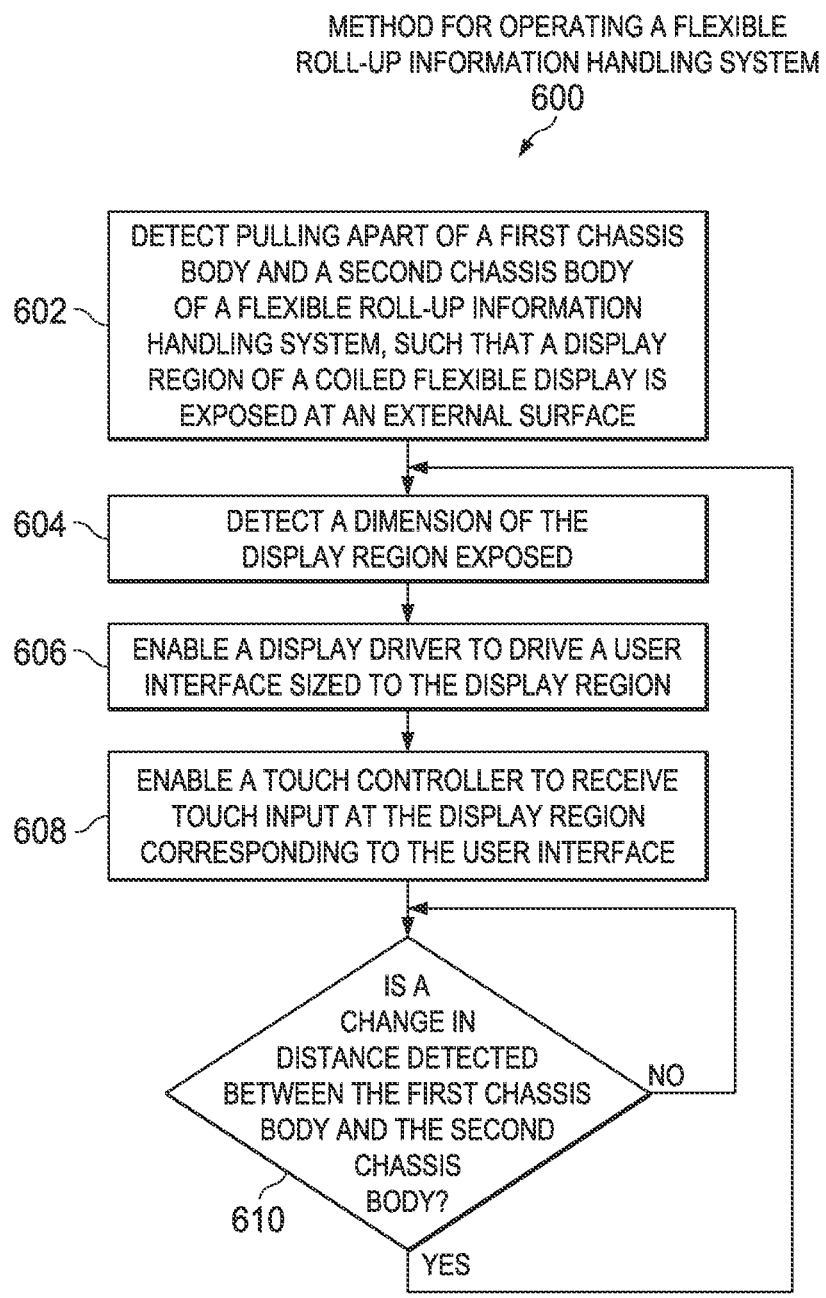
FIG. 6 is a flow chart of selected elements of an embodiment of a method for operating a flexible roll-up information handling system.

Referring now to FIG. 6, a flow chart of selected elements of an embodiment of method 600 for operating a flexible roll-up information handling system, as described herein, is depicted. It is noted that certain operations described in method 600 may be optional or may be rearranged in different embodiments. Method 600 may be performed using processor subsystem 120 along with other components shown with information handling system 100 (see FIG. 1).

Method 600 may begin at, step 602, by detecting pulling apart of a first chassis body and a second chassis body of a flexible roll-up information handling system, such that a display region of a coiled flexible display is exposed at an external surface. At step 604, a dimension of the display region may be detected. At step 606, a display adapter may be enabled to drive a user interface sized to the display region. In step 606, an orientation (such as portrait or landscape orientation) of the user interface may also be determined and applied. At step 608, a touch controller may be enabled to receive touch input at the display region corresponding to the user interface. The touch controller may be integrated within I/O subsystem 140 to drive touch sensors included in display layer 508. At step 608, a decision may be made whether a change in distance is detected between the first chassis body and the second chassis body. When the result of step 608 is NO, and no change in distance is detected, method 600 may loop back to step 608. When the result of step 608 is YES, and a change in distance is detected, method 600 may loop back to step 504.

As disclosed herein, a flexible roll-up information handling system may include two chassis bodies that are connected using two scissor hinges for opening and closing. A coiled flexible display may be provided at an external surface for operation by a user, and may be rolled up in one of the chassis bodies, while being fixed to the other chassis body. The scissor hinges may be adjusted to provide friction to balance the closing force of the coiled flexible display, which may include a steel spring backing layer.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A portable information handling system, comprising:
    a coiled flexible display comprising a spring layer and a display layer bonded together, wherein at least a portion of the coiled flexible display is accessible at an external surface of the portable information handling system;
    a first chassis body for receiving a coil bushing attached to a first end of the coiled flexible display, the coil bushing enabled to roll up the coiled flexible display around the coil bushing;
    a second chassis body for receiving a second end of the coiled flexible display attached to the second chassis body;
    a magnetic touch sensor included by the display layer to detect a change in stress in the display layer that indicates a degree of separation between the first chassis body and the second chassis body; and
    a display adapter to adjust a size of a user interface provided on the display layer that is based on the degree of separation.

2. The portable information handling system of claim 1, wherein the display layer includes touch sensors and wherein the portable information handling system uses the touch sensors to receive touch input from a user.

3. The portable information handling system of claim 2, further comprising:
    a cylindrical opening penetrating the coil bushing for receiving a stylus usable to provide the touch input.

4. The portable information handling system of claim 1, further comprising:
    two scissor hinges coupled to the first chassis body and the second chassis body, wherein each of the scissor hinges is coupled using two low friction pins respectively to the first chassis body and the second chassis body.

5. The portable information handling system of claim 4, wherein each of the scissor hinges further comprises:
    a hinge pin to open and close the scissor hinge, wherein the hinge pin allows for mechanical adjustment of a frictional force to open and close the scissor hinge.

6. The portable information handling system of claim 5, wherein the frictional force is selected to maintain a particular distance of separation between the first chassis body and the second chassis body when the scissor hinge is opened or closed.

7. The portable information handling system of claim 1, wherein the spring layer provides a closing force to rotate the coil bushing and bring the first chassis body and the second chassis body together.

8. The portable information handling system of claim 1, wherein the display layer includes an organic light emitting diode array.

9. The portable information handling system of claim 8, wherein a radius of the coiled bushing is selected to exceed a minimum bending radius for the organic light emitting diode array.

10. The portable information handling system of claim 1, further comprising a thermal sensor that detects a change in temperature of the display that further indicates the degree of separation between the first chassis body and the second chassis body.

11. The portable information handling system of claim 1, further comprising a capacitive touch sensor that detects a change in capacitance of the display that further indicates the degree of separation between the first chassis body and the second chassis body.

12. A display device for a portable information handling system, the display device further comprising:
- a coiled flexible display comprising a spring layer and a display layer bonded together, wherein at least a portion of the coiled flexible display is accessible at an external surface of the portable information handling system, wherein the display layer includes touch sensors, and wherein the portable information handling system uses the touch sensors to receive touch input from a user;
- a first end of the coiled flexible display attached to a first chassis body for receiving a coil bushing, the coil bushing enabled to roll up the coiled flexible display around the coil bushing;
- a second end of the coiled flexible display attached to a second chassis body;
- a magnetic touch sensor included by the display layer to detect a change in stress in the display layer that indicates a degree of separation between the first chassis body and the second chassis body; and
- a display adapter to adjust a size of a user interface provided on the display layer that is based on the degree of separation.

13. The display device of claim 12, further comprising:
- two scissor hinges coupled to the first chassis body and the second chassis body, wherein each of the scissor hinges is coupled using two low friction pins respectively to the first chassis body and the second chassis body.

14. The display device of claim 13, wherein each of the scissor hinges further comprises:
- a hinge pin to open and close the scissor hinge, wherein the hinge pin allows for mechanical adjustment of a frictional force to open and close the scissor hinge.

15. The display device of claim 14, wherein the frictional force is selected to maintain a particular distance of separation between the first chassis body and the second chassis body when the scissor hinge is opened or closed.

16. The display device of claim 12, wherein the spring layer provides a closing force to rotate the coil bushing and bring the first chassis body and the second chassis body together.

17. The display device of claim 12, further comprising:
- a cylindrical opening penetrating the coil bushing for receiving a stylus usable to provide the touch input.

18. The display device of claim 12, wherein the display layer includes an organic light emitting diode array.

19. The display device of claim 18, wherein a radius of the coiled bushing is selected to exceed a minimum bending radius for the organic light emitting diode array.

* * * * *